(12) United States Patent
Waterson et al.

(10) Patent No.: US 7,706,520 B1
(45) Date of Patent: Apr. 27, 2010

(54) SYSTEM AND METHOD FOR FACILITATING TRANSCRIPTION OF AUDIO RECORDINGS, WITH AUDITING

(75) Inventors: Christopher R. Waterson, San Francisco, CA (US); Lloyd William Tabb, Santa Cruz, CA (US); Michael Toy, Los Altos, CA (US)

(73) Assignee: LiveOps, Inc., Santa Clara, CA (US)

( * ) Notice: Subject to any disclaimer, the term of this patent is extended or adjusted under 35 U.S.C. 154(b) by 753 days.

(21) Appl. No.: 11/269,296

(22) Filed: Nov. 8, 2005

(51) Int. Cl.
*H04M 3/00* (2006.01)
*H04M 5/00* (2006.01)

(52) U.S. Cl. ............................ 379/265.06; 379/265.02; 379/265.03; 379/265.11; 379/265.07; 704/235; 705/11

(58) Field of Classification Search ................. 704/235, 704/236, 274; 379/265.06, 265.03, 265.11, 379/265.07; 705/11
See application file for complete search history.

(56) References Cited

U.S. PATENT DOCUMENTS

| | | | | |
|---|---|---|---|---|
| 5,239,460 A * | 8/1993 | LaRoche | ..................... | 705/11 |
| 5,535,256 A * | 7/1996 | Maloney et al. | .............. | 379/309 |
| 5,696,811 A * | 12/1997 | Maloney et al. | ......... | 379/265.07 |
| 5,946,375 A * | 8/1999 | Pattison et al. | .......... | 379/112.01 |
| 6,038,544 A * | 3/2000 | Machin et al. | ................ | 705/11 |
| 6,058,163 A * | 5/2000 | Pattison et al. | ......... | 379/265.06 |
| 6,170,011 B1 * | 1/2001 | Macleod Beck et al. | .... | 709/224 |
| 6,212,178 B1 * | 4/2001 | Beck et al. | .................. | 370/352 |
| 6,263,049 B1 * | 7/2001 | Kuhn | ....................... | 379/32.01 |
| 6,269,189 B1 * | 7/2001 | Chanod | ....................... | 382/229 |
| 6,366,666 B2 * | 4/2002 | Bengtson et al. | ........ | 379/265.06 |
| 6,381,640 B1 * | 4/2002 | Beck et al. | ................. | 709/223 |
| 6,466,663 B1 * | 10/2002 | Ravenscroft et al. | ... | 379/265.01 |
| 6,539,419 B2 * | 3/2003 | Beck et al. | .................. | 709/204 |
| 6,542,602 B1 * | 4/2003 | Elazar | ................... | 379/265.06 |
| 6,603,854 B1 * | 8/2003 | Judkins et al. | ......... | 379/265.06 |
| 6,700,971 B1 * | 3/2004 | Cohen et al. | ........... | 379/265.06 |
| 6,859,523 B1 * | 2/2005 | Jilk et al. | ................. | 379/32.01 |
| 6,865,258 B1 * | 3/2005 | Polcyn | .................... | 379/88.01 |
| 6,898,277 B1 * | 5/2005 | Meteer et al. | .......... | 379/265.02 |
| 6,910,072 B2 * | 6/2005 | Macleod Beck et al. | .... | 709/224 |

(Continued)

OTHER PUBLICATIONS

U.S. Appl. No. 10/886,333, filed Jun. 5, 2008, Everingham et al., Notice of Allowance.

*Primary Examiner*—Talivaldis Ivars Smits
*Assistant Examiner*—Greg A Borsetti
(74) *Attorney, Agent, or Firm*—PatentEsque Law Group, LLP; Roxana H. Yang (57) ABSTRACT

A system and method for facilitating transcription of an audio recording, with auditing. An IVR (Interactive Voice Response) unit makes a set of audio recordings of a caller's input during a call. The set of audio recordings is stored in a database and queued for transcription by remote agents. The recordings are forwarded to a first agent who listens to the audio and completes a form with text corresponding to the audio. The system then determines whether to audit the first agent's transcription by having another agent transcribe the same set of recordings. The recordings may be re-queued and transcribed multiple times, until two (or more) of the transcriptions match, or until some threshold number of transcriptions have been obtained. An agent may contact the caller (e.g., via telephone or electronic mail) if a recording cannot be fully transcribed.

15 Claims, 4 Drawing Sheets

U.S. PATENT DOCUMENTS

| | | | | |
|---|---|---|---|---|
| 6,959,079 B2 * | 10/2005 | Elazar | ................... | 379/265.06 |
| 7,151,826 B2 * | 12/2006 | Shambaugh et al. | ... | 379/265.02 |
| 7,191,133 B1 * | 3/2007 | Pettay | ........................ | 704/270 |
| 2004/0064317 A1 * | 4/2004 | Othmer et al. | .............. | 704/260 |
| 2004/0093257 A1 * | 5/2004 | Rogers et al. | .................. | 705/10 |
| 2004/0165717 A1 * | 8/2004 | McIlwaine et al. | ..... | 379/265.06 |
| 2004/0202308 A1 * | 10/2004 | Baggenstoss et al. | .. | 379/265.06 |
| 2005/0096912 A1 * | 5/2005 | Yacoub et al. | ............... | 704/275 |
| 2006/0233347 A1 * | 10/2006 | Tong et al. | ............. | 379/265.06 |

* cited by examiner

SYSTEM AND METHOD FOR FACILITATING TRANSCRIPTION OF AUDIO RECORDINGS, WITH AUDITING

BACKGROUND

This invention relates to the fields of computers and communications. More particularly, a system and methods are provided for facilitating the transcription of recorded audio, with auditing of the transcription to promote a desired level of accuracy.

Raw audio, such as speech, is often recorded during telephone calls, meetings, dictation and other situations. An audio recording may be made for archival purposes, later replay, for monitoring and/or other purposes.

For example, a call center may be operated to receive telephone calls from people seeking a product or service. A call may be recorded to allow a supervisor to review an operator's or agent's handling of the call or to verify a caller's order at some later time.

It may be necessary or desirable to transcribe recorded audio to obtain a transcript, perhaps to generate a shipping order for the caller. However, there is nothing to keep a transcriber from accidentally or purposefully generating an inaccurate transcription, because usually no one will review her work. If the transcription is used to place an order or address a shipment to the caller, an inaccurate transcription may lead to further errors that may be costly to correct.

A transcriber may be less than diligent in her transcription, for example, if she is in a hurry to finish her work, has many recordings to transcribe, is paid on a per-transcription basis, or for other reasons. As a result, it may be difficult or impossible to achieve a desired level of transcription accuracy or even measure an existing level of transcription accuracy. In addition, if a recording is garbled or otherwise flawed, existing transcription methods cannot retrieve the missing or undecipherable content.

Thus, there is a need for a system and method that, in addition to facilitating the transcription of recorded audio, can also take action to verify the accuracy of a transcription.

SUMMARY

In one embodiment of the invention, a system and methods are provided for facilitating transcription of an audio recording, with auditing. An IVR (Interactive Voice Response) unit makes a set of audio recordings of a caller's input during a call. The recordings capture the caller's verbal recitation of information such as name, address, city, and so on, and may also capture DTMF input corresponding to the caller's telephone key presses representing his telephone number, zip code, etc.

In this embodiment, the IVR unit posts the audio recordings to an internal web server that acts as a proxy to store the recordings in a database. The set of recordings is then queued for transcription by agents.

The set of recordings is forwarded to a first agent who listens to the audio and completes a form with text corresponding to the audio. The form may also accept the agent's ranking of call or recording quality and allow the agent to indicate whether the caller spelled his verbal input, whether any required or requested information was omitted by the caller, and/or other information.

The system then determines whether to audit the first agent's transcription. This decision may be partly or completely based on the agent's current error rate and a target service level representing a desired level of accuracy. Auditing involves having another agent transcribe the same set of recordings. The recordings may be re-queued and re-transcribed multiple times, until two (or more) of the transcriptions match, or until some threshold number of transcriptions has been obtained.

In one embodiment of the invention, an agent may contact the caller (e.g., via telephone or electronic mail) if a recording cannot be fully transcribed.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a system and method are provided for facilitating the transcription of recorded audio. Transcriptions may be audited to measure and/or increase a level of transcription accuracy.

In one implementation of this embodiment, an audio recording is made by an IVR (Interactive Voice Response) unit designed to handle calls from people wishing to purchase a product or service. In this implementation, the IVR unit may handle an entire call or just a portion of the call; a live agent may or may not be involved in the call.

The IVR unit may record snippets of audio from a call, such as the caller's response to prompts for his or her name, address, city, state, and so on, or may record substantially all of the caller's speech. The IVR unit may also record DTMF (Dual Tone Multi-Frequency) input when the caller inputs his or her telephone number and/or other information via a telephone keypad or other input device that generates DTMF tones.

Audio recorded from a call is then stored and queued for transcription. A transcription agent may access the audio recordings via a web browser or other user interface designed to allow the agent to play some or all of a recording. The interface accepts the agent's transcription of the audio, and may also accept a rating of the quality of the recording, an indication of whether the caller spelled his or her name or other input, whether any requested data were not provided by the caller, and/or other information about the recording or the corresponding call (e.g., the clarity of the caller's speech).

After the agent completes the transcription, the audio recording may be queued again, for transcription by another agent. If the two agents' transcriptions match exactly, or agree to within some degree of acceptable variation, the transcriptions are approved. If the two transcripts differ, one or more additional transcriptions may be sought. Any number of transcriptions may be obtained until two (or more) of them agree. An agent may or may not be aware that she is transcribing a recording previously transcribed by another agent, or that another agent has transcribed or will transcribe a recording that she transcribed.

Figure 1:
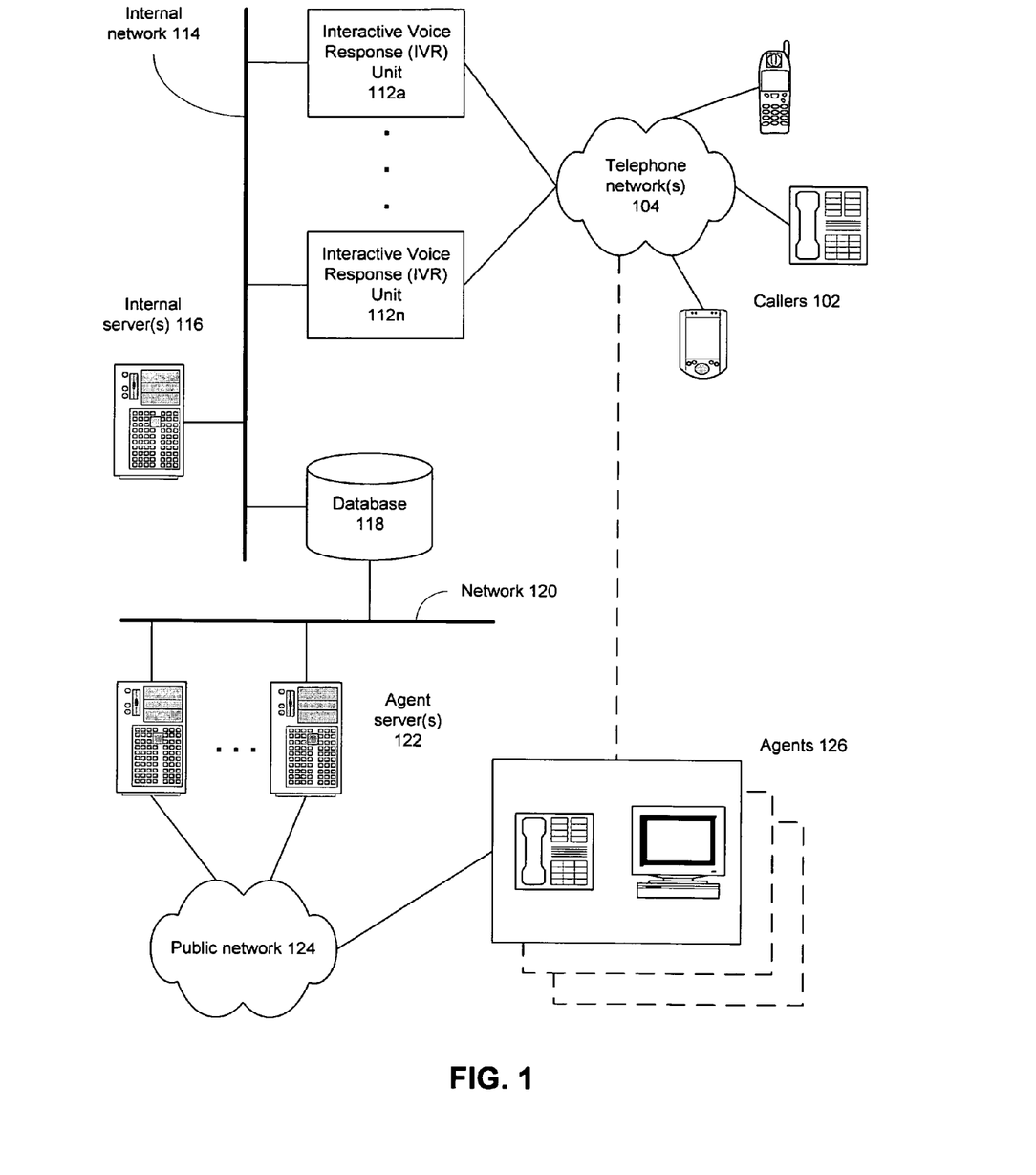
FIG. 1 is a block diagram depicting a computing/communication environment in which an embodiment of the invention may be implemented.

FIG. 1 is a diagram of a communication environment in which an embodiment of the invention may be implemented.

In this environment, callers 102 seeking to purchase goods or services establish telephone connections with IVR units 112 via telephone network(s) 104, which may include the Public Switched Telephone Network (PSTN) and/or a publicly available network (e.g., the Internet) that supports broadband telephony (e.g., VoIP or Voice over Internet Protocol).

An illustrative IVR unit comprises a computer system configured to play audio to prompt a caller for input and record the caller's input via speech and/or DTMF tones or other signals.

IVR units 112 are coupled to database 118 and one or more internal servers 116 via internal network 114 and/or other data communication links. Internal server 116 may comprise a web server, data server, application server or other type of computer server, and may act as a proxy or front-end through which the IVR units can store data in database 118. Alternatively, an IVR unit may be configured to store data directly to database 118 without the assistance of an internal server.

Database 118 stores audio recordings created by IVR units 112. In one embodiment of the invention, a single call may yield multiple separate recordings, each of which may be stored as a separate file. For example, each snippet of voice input by the caller (e.g., the caller's spoken name, spoken address) provided in response to an IVR unit prompt may be recorded and stored separately. DTMF tone inputs (e.g., telephone number, zip code) may also be stored as separate recordings. As one alternative, some or all of the individual speech and/or DTMF input snippets from a caller may be concatenated for storage as one file.

Via network 120, or other direct or shared communication links, database 118 is coupled to one or more agent servers 122, which may comprise web servers, application servers and/or other types of servers for interfacing with and supporting agents 126. In an alternative embodiment of the invention, networks 114, 120 may be merged, or one may comprise the other.

In the illustrated embodiment of the invention, agents 126 access agent servers 122 via public switched network 124, which may comprise the Internet. Agent servers 122 serve audio recordings to agents 126 via web browsers operating on computer systems operated by the agents. The agent servers may also serve or provide other information or data to agents, such as a form for entering a transcription, scripts for handling telephone calls, etc.

After a set of audio recordings from a call is stored in database 118, the recordings are queued (e.g., as a single job or task) in the database, on an agent server or at some other location from which they can be served to agents. Agents access the queued recordings via their web browsers, with a set of recordings being automatically transmitted to an agent when he or she becomes available or requests a new set of recordings.

In one embodiment of the invention, agents 126 are also coupled to telephone networks 104. In this embodiment, if a recording is so garbled or otherwise flawed (e.g., the caller provided no intelligible input in response to a prompt), the transcribing agent may contact the caller in order to elicit the missing information. Also, an agent may handle an entire live call from a caller, may receive a call after it is partially handled by an IVR unit 112, or may pass a call to an IVR unit after partially processing it.

Agents 126 may be considered remote agents because they are located in or work in locations remote from other components of the system, such as database 118, internal server 116, IVR units 112, etc.

In an embodiment of the invention, an audit frequency is computed to determine how often to audit agents' transcriptions, or whether to audit a particular transcription, in order to promote a desired level of accuracy. As described above, auditing involves having one or more different agents transcribe the same recording, and comparing the transcriptions to find two that match.

Because more than one re-transcription of a recording may be made, an audit may actually involve auditing multiple agents. More specifically, a first agent making a first transcription of a recording is audited by having one or more additional agents transcribe the same recording. Until two or more transcriptions match, each subsequent agent is also being audited. If, however, a recording is determined to be so indecipherable, incoherent or garbled that transcription is not possible, the agents who attempted to transcribe the recording may not be penalized.

To determine an audit rate or determine whether to audit a particular transcription, a target service level is selected that represents a desired level of accuracy. The service level may be normalized, so that an 80% accuracy rate (meaning that 80% of an agent's transcriptions are done correctly) is represented as 0.8, 85% is represented as 0.85, and so on. The target service level may be represented herein as $\lambda$. A reasonable target service level in one embodiment of the invention is 0.9.

It is assumed that agents make erroneous transcriptions at a rate $\epsilon$, such that $1-\epsilon<\lambda$. In other words, the probability that a transcription is accurate is less than the target service level. To maintain the target service level $\pi$, transcriptions will be audited at a rate $\alpha$, wherein $0 \leq \alpha \leq 1$.

An employee's error rate can be calculated using a fraction in which the denominator is the number of times the agent has been audited and the numerator is the number of those audits in which the agent's transcription was successful (i.e., matched one or more other agents' transcriptions). In one implementation, an error rate $\epsilon$ may be calculated as 1 minus this fraction.

The audit rate $\alpha$ can now be expressed in terms of service level $\lambda$ and error rate $\epsilon$. It is assumed that error rate $\epsilon$ is known, and that detecting an incorrect transcription results in correcting that transcription.

Audit rate a should be chosen such that service level $\lambda$ will be at least as high as the number of correct transcriptions $(1-\epsilon)$ plus the number of detected (and corrected) erroneous transcriptions $(\alpha^*\epsilon)$. This yields the following approximation:

$$\lambda \leq (1-\epsilon)+(\alpha^*\epsilon) \qquad (1)$$

Solving (1) yields a lower bound for $\alpha$:

$$\alpha \geq (\lambda+\epsilon-1)/\epsilon \qquad (2)$$

In this embodiment of the invention, a finite number of transcriptions will be made of a given audio recording. By limiting the maximum total number of transcriptions of a recording to n, the chance that an erroneous transcription will be corrected within the remaining n−1 transcription attempts is:

$$1-\epsilon^{n-1}$$

Applying a more precise error correction rate, based on the maximum number of re-transcriptions, equation (1) can be rewritten as:

$$\lambda \leq (1-\epsilon)+(\alpha^*\epsilon)^*(1-\epsilon^{n-1}) \quad (3)$$

Rearrangement yields:

$$\alpha \geq (\lambda+\epsilon-1)/(\epsilon-\epsilon^n) \quad (4)$$

Figure 2:
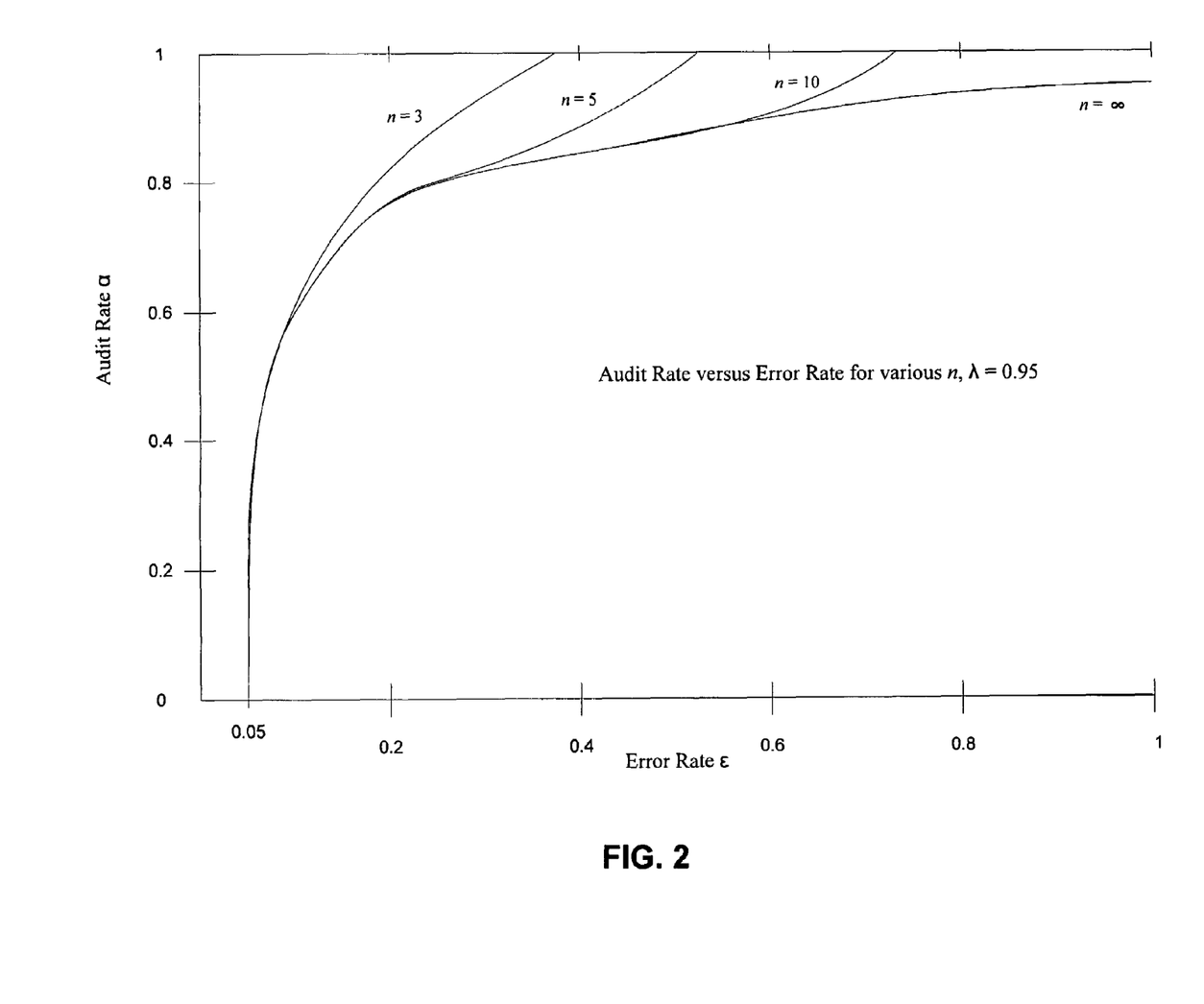
FIG. 2 is a graph illustrating audit rates for maintaining a service level of 95% with various error rates, according to one embodiment of the invention.

FIG. 2 depicts a curve representing equation (4), showing how different values of n affect the curve for a target service level of 0.95 (95%). As shown in FIG. 2, with a small error rate $\epsilon$, applying a modest maximum number of transcriptions n results in only marginal differences in audit rate $\alpha$, as compared with an unlimited number of transcriptions. For example, the curve for n=5 is indistinguishable from the curve for n=∞, until error rate $\epsilon$ exceeds approximately 0.33.

Figure 3:
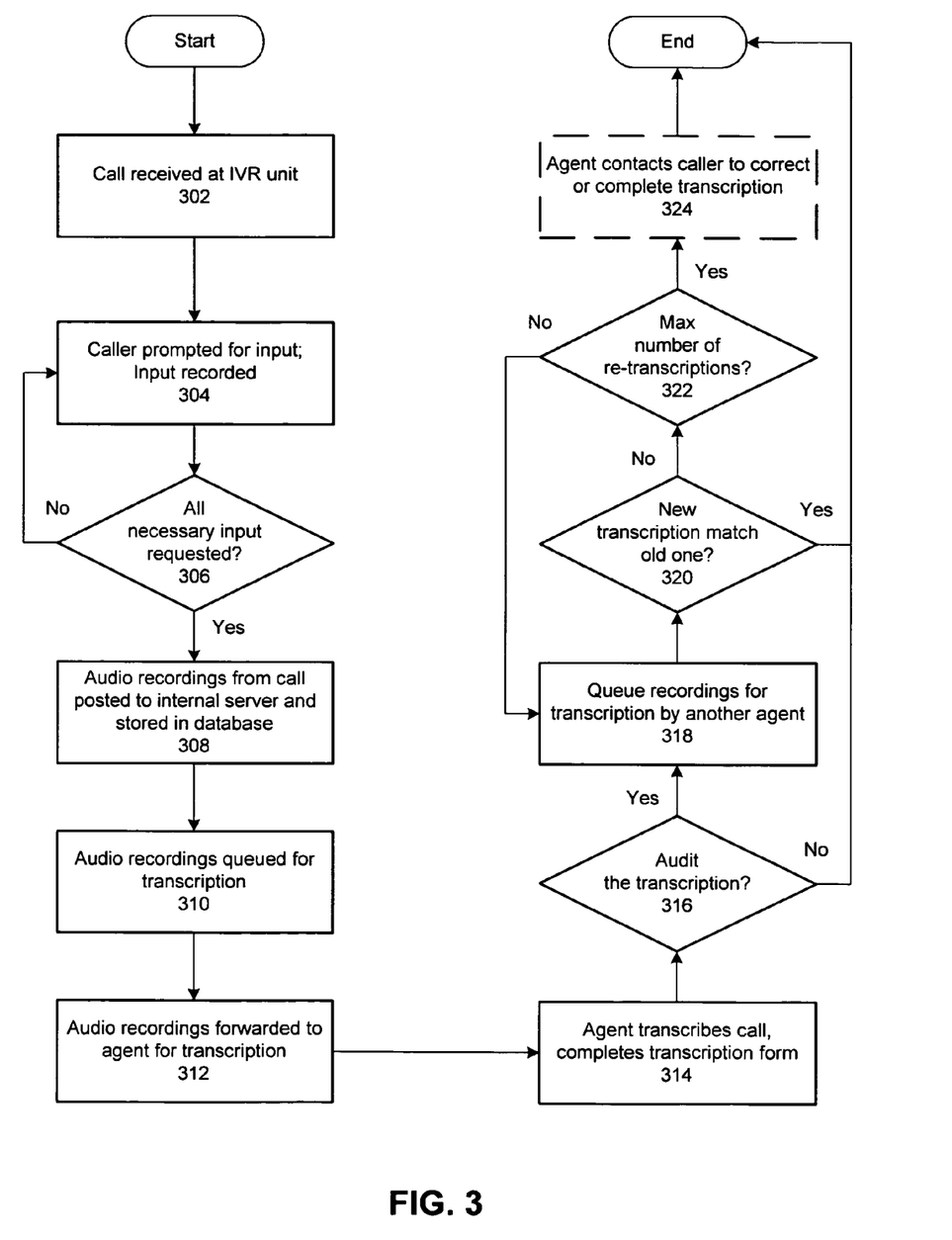
FIG. 3 is a flowchart illustrating a method of facilitating the transcription of recorded audio, with auditing, according to one embodiment of the invention.

FIG. 3 is a flowchart demonstrating a method of facilitating the transcription of an audio recording, with auditing, according to one embodiment of the invention.

In operation 302, a caller is connected to an IVR unit and asked to provide some information. The caller may be calling from a mobile or land-line telephone, or may be using broadband telephony from a computer system. The caller may be calling for the purpose of buying a product or service, may be seeking information, or may be calling for some other purpose.

In one embodiment of the invention, a call may be selectively routed to either an IVR unit or a live agent, depending on the telephone number that was dialed and/or the purpose of the call. A pool of live agents for receiving calls may comprise a set of agents that also transcribe audio recordings, or the two groups of agents may be separate.

In operation 304, the IVR-unit prompts the caller for some verbal input and records the caller's response. For example, the IVR unit may ask the caller to speak his name, address, city or other information that contains little or no numeric content (e.g., description of service desired, a personalization option for a product). The IVR unit may also ask the caller to provide, via a telephone keypad or other device (e.g., a keyboard for a broadband telephone call), his telephone number, zip code, numeric choices from a menu, and/or other numeric input.

Each input is recorded as a separate recording. In this embodiment of the invention, a caller may be asked for any number of voice and/or DTMF inputs, each of which constitutes one audio fragment or snippet of the call.

In operation 306, if all required input has been requested, the illustrated method advances to operation 308. Otherwise, the method returns to operation 304 to request the next input.

In operation 308, the raw audio fragments of the call are posted (e.g., using HTTP POST operations) to a web server (e.g., internal server 116 of FIG. 1), data server or other appropriate location temporarily, and then stored in a database (e.g., database 118). The fragments may be maintained as separate files, or some or all of them may be combined into a single recording or file.

Illustratively, each set of recordings (i.e., from one call) may be stored in a separate temporary directory on the web server. The names of the directory and/or individual recording files may identify the call (e.g., by session identifier), date/time, IVR unit, content of the fragment (e.g., name, address, telephone number), etc.

In this embodiment of the invention, the web server periodically or continuously checks for newly stored audio recordings. When a set of recordings is found, they may be converted into another format (e.g., MP3), with or without compression, in conjunction with being stored in the database.

In operation 310, audio recordings from the call are queued for transcription. The transcription queue may be maintained on the database, a data server that serves content from the database, a web server or other computer system or systems.

A set of audio recordings may be marked or flagged to indicate its status. For example, if the recorded audio will be used to place an order for a good or service, this status may be indicated on the transcription job so that the completed transcript can be routed or handled properly to generate the order. The transcription status may also be noted (e.g., queued, being transcribed).

In operation 312, the set of recordings (e.g., from one call) is forwarded to an agent, and a form for receiving the agent's transcription is opened on the agent's browser, if not already open. Illustratively, the form contains fields in which the agent enters text transcribed from the recordings, and icons, buttons or other controls for playing or replaying an audio fragment.

In this embodiment of the invention, an agent explicitly requests a transcription job from the queue or his/her availability is automatically determined based on monitoring of the agent's status. Agents are equipped with computer systems configured to execute a web browser or other suitable user interface. Through the web browser the agent indicates her availability to accept a transcription job or an incoming telephone call, receives scripts (or other forms) for completion while transcribing a recording or handling a call, and/or takes other action related to transcription or call handling.

Illustratively, agents may be independent contractors working from sites of their choosing (e.g., their homes). Therefore, direct oversight of an agent's work may not be possible.

In operation 314, the agent transcribes the audio recordings and fills in the transcription form. The agent may rate the call based on how difficult it was to understand the caller's speech, how noisy or distorted the call or recording was, etc. The agent may also indicate whether the caller failed to provide some requested information, did or did not spell his name, address or other verbal information, and so on.

An agent may be allotted a limited amount of time to complete a transcription (e.g., five minutes). If the transcription is not complete after this time expires, the recordings may be returned to the queue for transcription by another agent.

The agent may hear the entire call, just the audio recordings of the caller's verbal input needed to complete the caller's order, the audio recordings merged with DTMF input, or any other combination of the caller's verbal input, DTMF or other signal input, and audio played by the IVR unit that handled the call.

In operation 316, upon completion of the agent's transcription, a decision is made whether to audit the transcription. This decision may be made by a server that maintains the transcription queue, a data server that maintains the database, or some other entity.

As described above, the decision may be based on the agent's current error rate and an audit rate $\alpha$, which may be computed as described above. The agent's error rate may be updated each time she is audited and/or audits another agent.

Based on the error rate and audit rate, the system may flip a weighted coin (weighted according to the audit rate) to determine whether to audit the transcription. In other embodiments of the invention, other mechanisms or algorithms may be employed to decide whether to initiate an audit.

In the illustrated embodiment of the invention, if the agent's current error rate ϵ is low enough, based on the target accuracy level λ (e.g., if ϵ≦1−λ), then the agent's transcription will not be audited.

If the agent's transcription is to be audited, the method continues at operation 318. Otherwise, the agent's transcription may be considered successful and the method ends.

In operation 318, the set of recordings is re-queued for transcription by another agent. When re-queued, the recordings may be sent to any agent who has not already transcribed them. Illustratively, they may be flagged or other action taken to ensure the recordings are not given to the same agent again.

In operation 320, it is determined whether the transcription by another agent matches a previous agent's transcription. The transcriptions may need to match exactly as regards the content, or may be allowed to differ to some degree and still constitute a match. If there is a match, the transcription is considered successful and the method ends. Otherwise, the method advances to operation 322.

In operation 322, the number of times this set of recordings has been transcribed is compared to a threshold. In this embodiment of the invention, a maximum number of transcriptions is set to prevent indefinite re-transcriptions, limit costs, identify the recordings as not transcribable, or for other reasons.

An illustrative maximum number of transcriptions is five; after five transcriptions it may be assumed that the audio cannot be transcribed due to communication problems during the call, an incomprehensible caller, etc. If the maximum number of transcriptions has been attempted, the illustrated method continues to operation 324, may end with an error status or other action may be taken (e.g., a specialized or supervisory agent may transcribe the recordings); otherwise, the method returns to operation 318.

In optional operation 324, an agent contacts the caller (e.g., via telephone, via electronic mail) to obtain information that could not be transcribed from the recordings. The information to be obtained may have been missing from the audio recordings (e.g., not provided by the caller) or may not have been understandable. After operation 324, the method ends.

Operation 324 may be performed prior to the maximum number of transcription attempts being exhausted. For example, if the first agent (or any number of agents) indicates that some required information is missing or incomprehensible, the method may advance to operation 324 immediately.

In the embodiment of the invention depicted in FIG. 3, a transcription effort may end in success if a single agent's transcription is not audited, if two or more agents' transcriptions agree, or if the caller can be reached to obtain the necessary information. A transcription effort may fail if multiple agents' transcriptions all differ, and/or the caller cannot be reached or will not provide the missing information.

Upon completion of the auditing process, agents' error rates may be updated to include their performance. If an agent's transcription was one of the two (or more) that agreed, then the agent's transcription is considered correct. Otherwise, the agent's transcription may be considered incorrect.

Figure 4:
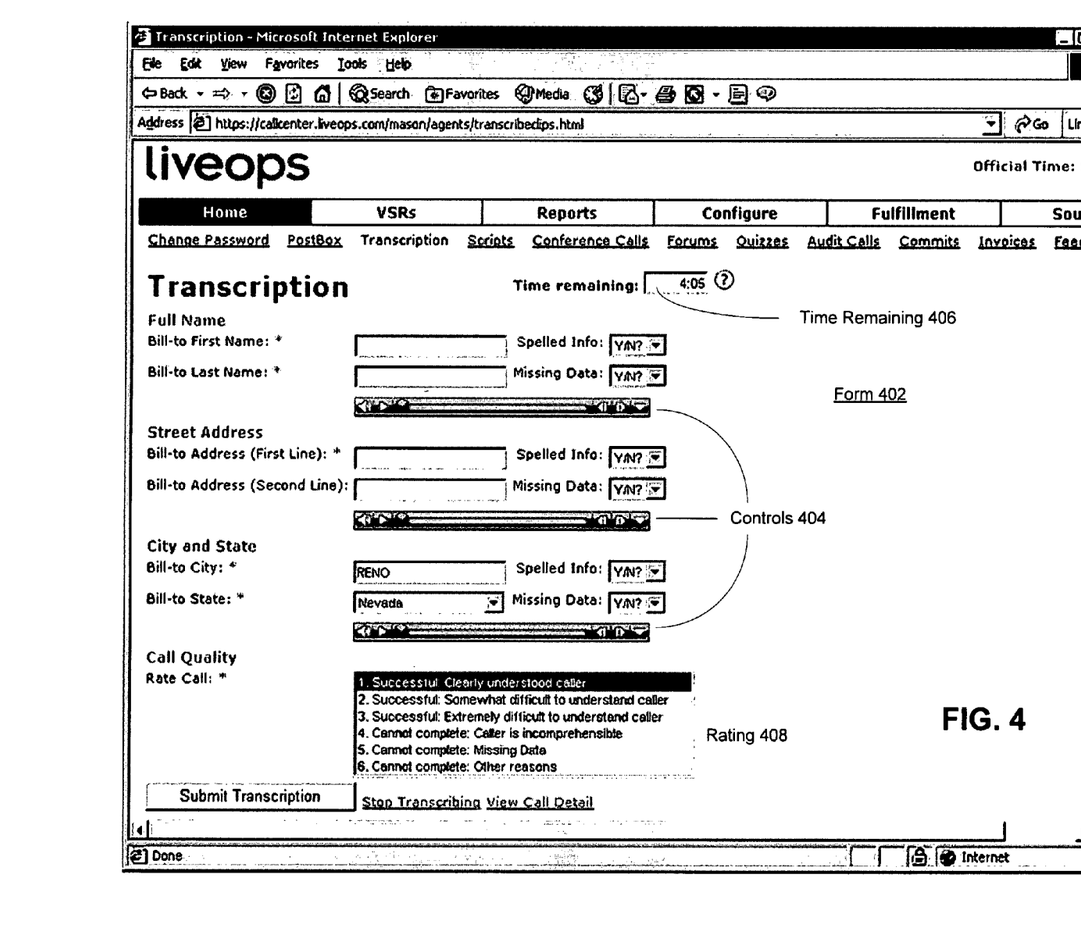
FIG. 4 illustrates a form that is filled in by agents while transcribing a set of audio recordings, according to one embodiment of the invention.

FIG. 4 is an illustrative form an agent may use to perform a transcription. Form 402 includes fields for entering the transcribed audio (e.g., "Full Name," "Street Address," "City and State"), and controls 404 for playing the audio recordings for the fields. Time remaining 406 indicates the remaining amount of time an agent has before the transcription job will be re-queued for another agent.

Form 402 also includes drop down menus enabling the agent to report whether the caller spelled his spoken information and whether any requested information was omitted. Rating 408 allows the agent to report whether the transcription was successful and to rate the quality of the recordings.

Some fields may be pre-filled based on caller DTMF input. For example, the City and State fields may be pre-populated based on a zip code or telephone number punched in by the caller.

In another embodiment of the invention, an agent may review another agent's handling of a telephone call (e.g., a call to purchase a product or service) rather than the other agent's transcription of audio recorded from a telephone call. The review may be performed to determine whether the other agent followed company guidelines, adhered to a script for handling calls, treated the caller with courtesy, etc. Further, the reviewing agent's review may be audited by having another agent review the same call. This may help ensure that the reviewers perform their reviews diligently.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. An automated computer-implemented method of facilitating and auditing the transcription of recorded audio, the method being executable as logic instructions on a computer device, comprising:
    (a) queuing a set of audio recordings on a computer device for transcription by a first remote agent;
    (b) receiving a first transcription of the set of audio recordings on said computer device from the first remote agent and determining whether to audit the first transcription by calculating an audit rate a based on a current error rate ϵ of the first agent and a desired level of accuracy λ;
    (c) if audit rate is higher than a threshold rate, re-queuing the set of audio recordings on said computer device for transcription by a second remote agent among a plurality of remote agents; and
    (d) receiving a next transcription on said computer device of the set of audio recordings from the second remote agent;
    wherein audit rate α indicates a frequency with which a transcript should be audited; said current error rate ϵ of the first agent represents a probability that the first transcription is incorrect; and said desired level of accuracy λ reflects a probability that a transcription is correct.

2. The method of claim 1, wherein (e) comprises repeating (c)-(d) until:

at least two transcriptions of the set of audio recordings match; or a threshold number of transcriptions of the set of audio recordings has been received.

3. The method of claim 1, further comprising, prior to (a):

receiving a call at an IVR (Interactive Voice Response) unit from a caller; and generating the set of audio recordings to record input from the caller.

4. The method of claim 3, further comprising:

facilitating a communication connection between an agent and the caller to elicit information that cannot be retrieved from the set of audio recordings.

5. The method of claim 1, wherein:

said audit rate $\alpha$ is calculated as $\alpha \geq (\lambda + \epsilon - 1)/(\epsilon - \epsilon^n)$; and wherein n>1 and represents a maximum number of transcriptions of the set of audio recordings to perform.

6. The method of claim 1, wherein said determining further comprises:

virtually flipping a weighted coin based on said audit rate $\alpha$.

7. The method of claim 1, further comprising:

serving the first remote agent a form for inputting the first transcription.

8. The method of claim 1, wherein (c) comprises re-queuing the set of audio recordings for transcription by a second remote agent without informing the first remote agent of the re-queuing.

9. A computer readable medium storing instructions that, when executed by a computer, cause the computer to perform a method of facilitating transcription of recorded audio, with auditing, the method comprising:

(a) queuing a set of audio recordings for transcription by a first remote agent;

(b) receiving a first transcription of the set of audio recordings from the first remote agent and determining whether to audit the first transcription by calculating an audit rate $\alpha$ based on a current error rate $\epsilon$ of the first agent and a desired level of accuracy $\lambda$;

(c) if the audit rate is higher than a threshold rate, re-queuing the set of audio recordings for transcription by a second remote agent among a plurality of remote agents; and (d) receiving a second transcription of the set of audio recordings from the second remote agent;

wherein audit rate $\alpha$ indicates a frequency with which a transcript should be audited; said current error rate $\epsilon$ of the first agent represents a probability that the first transcription is incorrect; and said desired level of accuracy $\lambda$ reflects a probability that a transcription is correct.

10. An apparatus for facilitating transcription of an audio recording, with auditing, the apparatus comprising:

an IVR (Interactive Voice Response) unit configured to record verbal input during a telephone call from a caller;

a database configured to store a set of audio recordings of the verbal input;

communication connections to a plurality of agents for transcribing audio recordings;

a web server configured to serve the set of audio recordings to one or more of the agents; and audit logic configured to determine whether to audit a transcription of the set of audio recordings performed by one agent by calculating an audit rate $\alpha$ based on a current error rate $\epsilon$ of the one agent and a desired level of accuracy $\lambda$ and, if the audit rate is higher than a threshold rate, having another agent transcribe the set of audio recordings;

wherein audit rate $\alpha$ indicates a frequency with which a transcript should be audited; said current error rate $\epsilon$ of the first agent represents a probability that the first transcription is incorrect; and said desired level of accuracy $\lambda$ reflects a probability that a transcription is correct.

11. The apparatus of claim 10, wherein said audit logic is configured to cause the set of audio recordings to be transcribed by different agents up to a threshold number of times.

12. The apparatus of claim 10, wherein said audit rate $\alpha$ is calculated as $\alpha \geq (\lambda + \epsilon - 1)/(\epsilon - \epsilon^n)$;

wherein n>1 and represents a maximum number of transcriptions of the set of audio recordings to perform.

13. The apparatus of claim 10, wherein said audit logic determines whether to have the set of audio recordings transcribed by another agent by flipping a weighted coin configured based on said audit rate $\alpha$.

14. The apparatus of claim 10, further comprising:

an internal server configured to store the set of audio recordings in the database for the IVR unit.

15. The apparatus of claim 10, wherein said web server is further configured to serve the agents a form designed to receive the agents' transcriptions.

* * * * *